May 6, 1958
F. N. SHARP
2,833,464
STRIP FORMED BLOWER WHEEL
Filed May 2, 1955
3 Sheets-Sheet 1
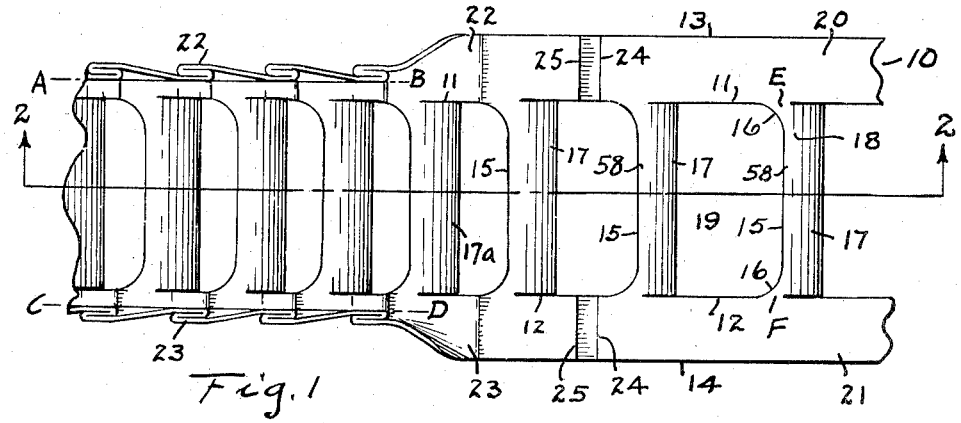
Fig. 1
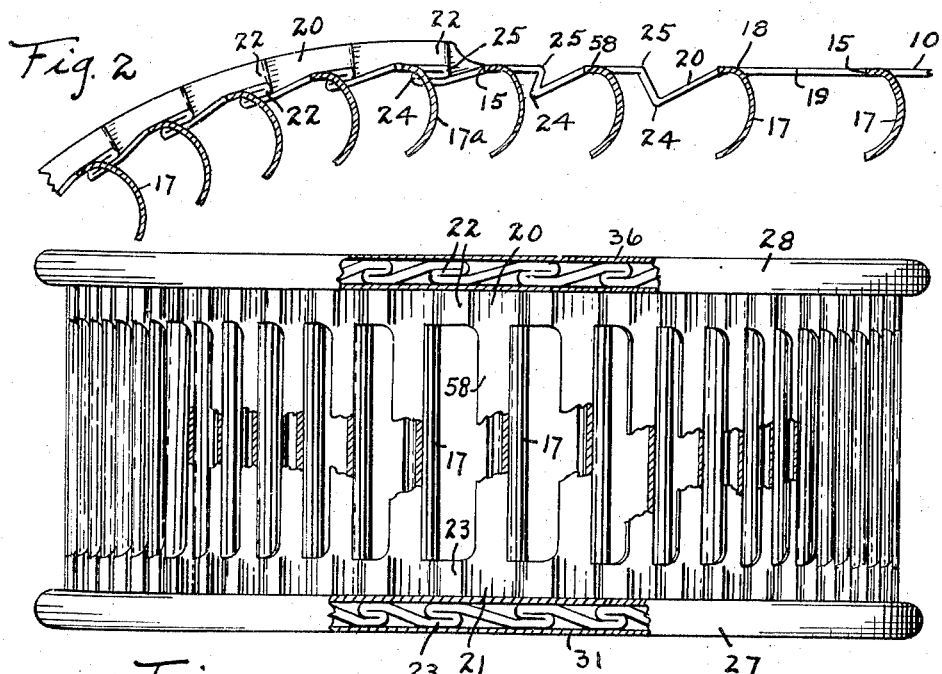
Fig. 2
Fig. 3
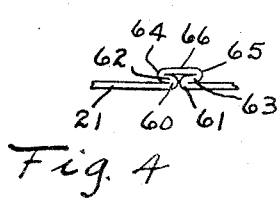
Fig. 4
INVENTOR
Floyd N. Sharp
By Herbert A. Meinturn
ATTORNEY May 6, 1958  F. N. SHARP  2,833,464
STRIP FORMED BLOWER WHEEL
Filed May 2, 1955  3 Sheets-Sheet 2

INVENTOR
Floyd N. Sharp
By Herbert A. Newbury
ATTORNEY

May 6, 1958  F. N. SHARP  2,833,464
STRIP FORMED BLOWER WHEEL
Filed May 2, 1955  3 Sheets-Sheet 3

INVENTOR
Floyd N. Sharp
By Herbert A. Minturn
ATTORNEY

United States Patent Office 2,833,464
Patented May 6, 1958

2,833,464

STRIP FORMED BLOWER WHEEL

Floyd N. Sharp, Columbus, Ind., assignor to Vernco Corporation, Columbus, Ind., a corporation of Indiana Application May 2, 1955, Serial No. 505,113

2 Claims. (Cl. 230—134)

This invention relates to a blower wheel which is formed by slitting a strip of metal to define blades one after another, pressing those blades into the desired curvature to extend from one common face of the strip and leaving openings through the strip from which the blades have been carried; shortening the distances between adjacent blades by plaiting the bands of the strip along the edges thereof outside of the ends of the blades; and bending the bands into continuous flanges and forming the strip into an annulus and joining together the ends of the strip to complete the circular form of the blower wheel. A back plate and a rim flange may be added.

This invention provides a structure commonly known as a blower wheel for use in oil burner installations, automotive heaters, and in fact in any installation requiring a wheel for moving air particularly at a high volumetric efficiency.

The problem to be met is to provide a wheel that will deliver the greatest possible volume of air and yet permit the smallest possible diameter and width of wheel since normally the space or housing wherein the wheel is to be mounted is extremely limited. The problem therefore arises as to how to get the largest number possible of air moving blades within a given circumference and a given length of blade.

Also the wheel has to be made extremely rigid so as to retain a dynamic balance to avoid noise and also to endure over long periods of time without requiring replacement. Furthermore, the blower wheel has to be made at the lowest possible cost of manufacture. This means that the wheel should be made with the minimum number of hand operations and in fact all hand operations avoided if possible so that the entire processing can be automatic. Also it is desirable to produce such a structure without having to weld together parts other than possibly the ends of the strip when forming the annulus. That is, it is highly desirable to avoid having to weld blades in place, or having to weld in place bands carrying those blades. The blades should be very evenly spaced apart one from the other around the circumference of the wheel.

The present invention solves the problem in a very unique and efficient manner as may be observed in the following description of the invention as illustrated in the accompanying drawings, in which Fig. 1 is a diagrammatic view in plan of a strip illustrating the successive steps in forming the major part of the wheel from a flat strip of metal;

Fig. 2 is a view in section on the line 2—2 in Fig. 1;

Fig. 3 is a view in side elevation and partial section of a finished blower wheel;

Fig. 4 is a view in detail in end elevation of a modified form of plait;

Figure 6:
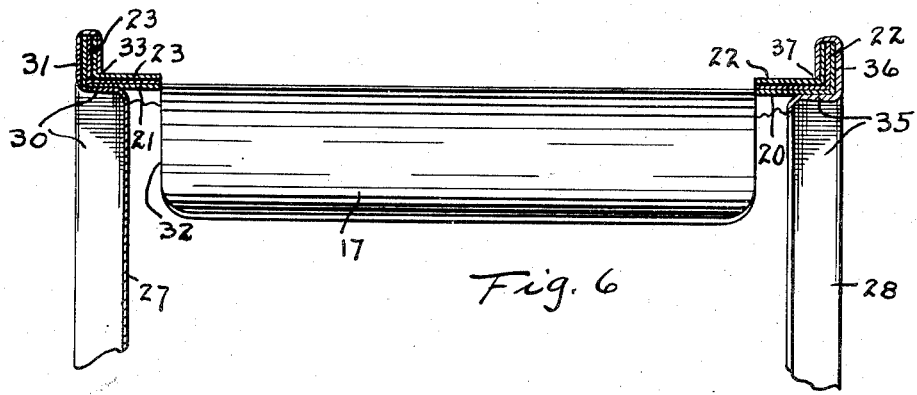
Fig. 6 is a view in section on the line 6—6 in Fig. 5.

Referring first to that form of the invention as illustrated in Figs. 1–6, a strip of metal generally designated by the numeral 10 is progressively slitted on longitudinal lines 11 and 12 spaced inwardly from the edges 13 and 14 of the strip 10 and by connecting transverse lines 15 joining with the lines 11 and 12 preferably through the radii 16. The material so defined by these lines is pressed or stamped from the plane of the strip 10 and formed into the blades 17 having a cross-section curvature somewhat as indicated in Fig. 2. These blades 17 are carried downwardly on transverse bend lines 18 to leave an opening through the strip designated by the numeral 19. The two parts of the strip 10 defined between the lines 11 and the edge 13 on the one side and the lines 12 and the edge 14 on the other side will be referred to as side bands designated respectively by the numerals 20 and 21.

In the present invention, it is desired that the distance between the fold line 18 and the line 15 be reduced in order to shorten effectively the longitudinal lengths of the strip 10 for a given circumference of a blower wheel in order that the greatest possible number of blades 17 may be included in that circumferential length.

To accomplish this shortening of the strip 10, the bands 20 and 21 are provided with a plurality of plaits generally designated by the numerals 22 and 23 in the respective bands 20 and 21. This plaiting is accomplished somewhat as indicated in Fig. 2 where the band 20 for example is folded along a line 24 transversely across the band and again folded along a second line 25 transversely thereacross, and then the fold 25 is carried over the fold 24 and brought down onto the face of the band 20 in a flattened manner to complete the plait as indicated at 22 in both Figs. 1 and 2. That is, the fold 25 is brought down on top of the face of the band 20 whereas the fold 24 is brought up against the underside of that face so that there are three thicknesses of metal through the plait and all thicknesses are in contact one with another without any spacing therebetween forming in fact a true plait. The plaits 23 along the band 21 are formed in the same manner. In this plaiting operation, the blade 17a for example is brought closer to the line 15 as is clearly evident in Fig. 1 particularly. In fact, in the present showing, the spacing is reduced by about half from the original positioning of the blade 17 in respect to the line 15. This spacing of course may be varied in accordance with the dimensions of the blade in turn determining the dimensions of the opening 19, and further in accordance with the amount of air flow required through the opening 19.

Referring to Fig. 4, a form of plait modified from that designated by the numerals 22 and 23 may be employed, wherein the plait form is what is known as a box plait. In this box plait, the band 21, for example, is folded back on itself in opposite directions from the two opposing folds 60 and 61 by lengths 62 and 63 which terminate respectively in the folds 64 and 65, in turn connected (all integrally) by the length 66. The folds are compressed to maintain the plait in a flattened condition. By placing the length 66 on the outer side of the wheel, any tendency of the plait to open up under high wheel speed is greatly resisted.

Following the plaiting operations, the bands 20 and 21 are folded or bent upwardly substantially at right angles to the top faces of the bands 20 and 21 along lines A—B and C—D respectively, these lines A—B and C—D being spaced outwardly from and parallel to the lines 11 and 12. Also preferably at the same time, the bands 20 and 21 are given a curvature, the radius of which corresponds to the radius of the finished wheel. This formation is indicated best in Fig. 2 in the left-hand end portion thereof.

By bending the bands 20 and 21 through plaits 22 and 23, an extremely rigid wheel is formed and the plaits do not open up radially regardless of the speed at which the wheel may be rotated. Obviously no welding is required in this structure since the plaits are fixed in position and cannot extend themselves circumferentially. The opposite ends of the strip 10 may then be merely abutted or preferably welded together (not shown) or in the absence of such welding, the wheel may be retained in its shape by means of the attaching to the strip 10 around the flange bands 20 and 21 a back plate 27 and a rim 28.

Figure 5:
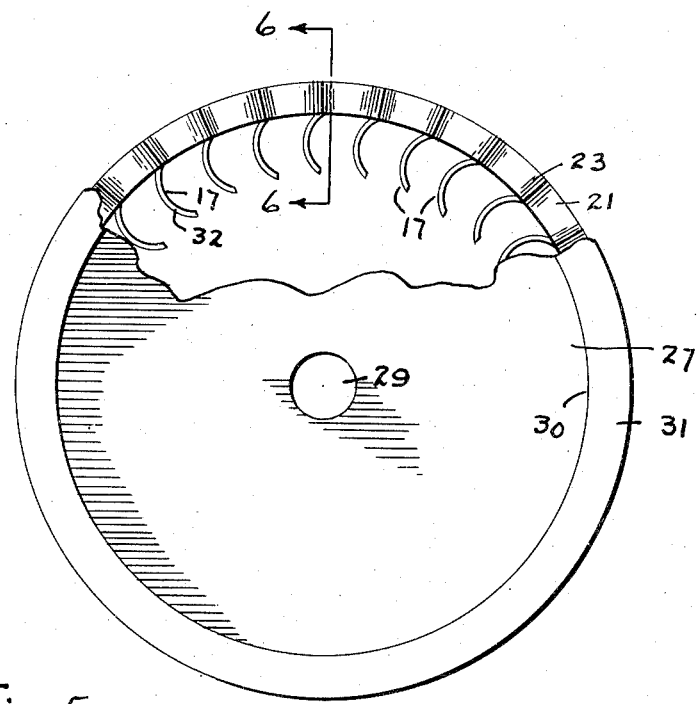
Fig. 5 is a view in end elevation from the back plate end with a portion of the plate broken away.

In this regard, reference is made to Figs. 5 and 6. The back plate 27 would constitute the driving member of the wheel, and the plate 27 is provided with a central opening 29 through which may be connected the shaft of a motor or the like as is well known to those versed in the art.

The plate 27 is provided with a rearwardly extending flange 30 to fit up snugly against the relatively underside of the strip 10, particularly the band 21. The flange 30 extends rearwardly a distance and then is abruptly turned radially therefrom by the face 31 substantially at right angles thereto. The length of the flange 30 is such that the plate 27 is spaced from the end 32 of the blade 17. Thus any minute vibration of a blade 17 is not directly transmitted to the forward face of the plate 27.

From the outer edge portion of the part 31, the metal is continued around and over and thence down on the front side of the plait 23 to terminate by an end 33 against the outer circumferential sides of the plaits. In this manner, Fig. 3, the plaits are securely engaged between the plate members 31 and 33 that is the parts of those plaits which are turned radially outwardly, and the plate 27 is thus fixed in position against moving in directions longitudinally of the blades 17, and at the same time, the curvature of the bands 20 and 21 is fixed.

The band 20 and its spaced apart plaits 22 are further fixed in their circumferential curvature by means of the outer ring 28 having an inturned flange 35 in intimate contact with the underside of the band 21, and is then carried around by a front flange 36 against the outer upturned ends of the plaits 22, thence over the tops thereof and down on the insides, to terminate by the end 37 against the outer sides of those plaits. This edge 37 is positioned at the junction of the outturned portions of the plaits 23 with the generally transversely disposed portions thereof, that is along the line C—D. In this manner, the upturned portions of the plaits 22 along the band 20 are engaged by the ring 28 and fixed in their circumferential curvature.

This structure so far described makes an exceedingly rigid and permanent blower wheel at a low cost of production.

Figure 7:
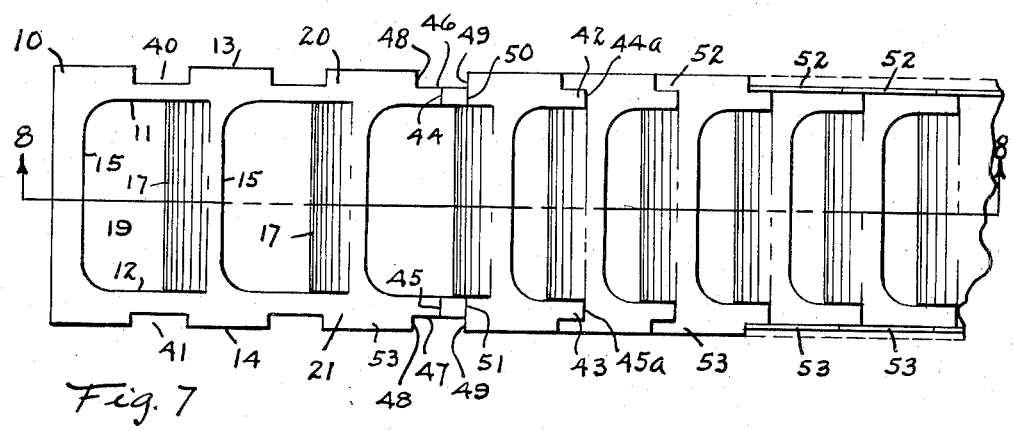
Fig. 7 is a diagrammatic view in plan of a strip showing a slightly modified step by step forming of the blades and side band.
Figure 8:
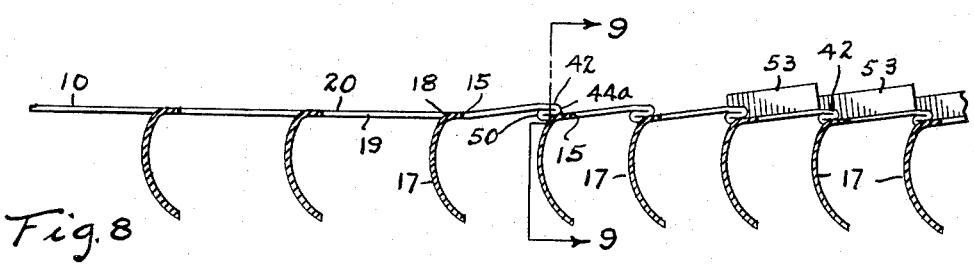
Fig. 8 is a view in section on the line 8—8 in Fig. 7.
Figure 9:
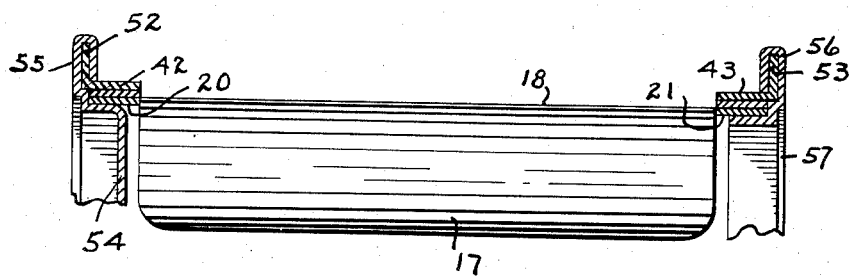
Fig. 9 is a view in section on an enlarged scale on the line 9—9 in Fig. 8.

Reference is now made to Figs. 7–9 wherein a slightly modified form of the flanging of the wheel is illustrated. This particular form permits the use of a thinner radial flange around each end of the wheel, so that the overall length of the wheel may be reduced by at least four thicknesses of the metal employed in the strip 10. Also in this form, the circumferential flange at each end of the wheel does not require to be bent through the plaits, but through band portions extending outwardly therefrom.

In this form as shown in Figs. 7–9, the blades 17 are punched outwardly therefrom, going from left to right in the same manner as shown in a previously described form. However in this case, the edges 13 and 14 of the strip 10 are provided with regularly spaced notches 40 and 41 along the respective edges. While not limiting the invention thereto, the depths of these notches 40 and 41 from the edges 13 and 14 may be substantially half the distance from those edges to the lines 11 and 12. The longitudinal length of these notches 40, 41 is made in each instance to be equal to the length of the plait desired in the side bands 20 and 21. The lengths of these plaits of course will determine the reduced spacing apart of the blades 17 from the lines 15.

Referring to Fig. 7, plaits 42 and 43 are formed as follows. A fold line 44 and 45 respectively is located to extend transversely of the bands 20 and 21 from the inner end line 46 and 47 of the notches 40 and 41 respectively substantially halfway between the side edges 48 and 49 of each of those notches. The fold lines 44 and 45 are then brought up and over another fold line 50 and 51 respectively coinciding with the notch end lines 49. The lines 44 and 45 are carried on over the fold 50 to come to that position whereby the notch edges 48 and 49 are brought one against the other, to bring the fold lines 44 and 45 to the positons 44a and 45a. The metal thus folded over is compressed into plaits as indicated in Fig. 8. The forming of these platis 42 and 43 thus brings the opening edge 15 closer to the blade fold line 18, to provide for an increased number of blades per unit length of the strip 10.

In making the plaits in this manner thus described, the bands 20 and 21 have outer edge portions 52 and 53 defined between the edges 13 and 14 and the inner lines 46 and 47 of the notches 40 and 41. These side portions 52 and 53 are then bent substantially at right angles to the outer face of the strip 10 as indicated at the right-hand end of Fig. 7, and also in Fig. 8, to form members of a continuous outwardly extending flange around each side of the strip 10, these members 52 and 53 being carried into approximately a common plane in each instance so that the back plate 54, Fig. 9, may have the outer end portion 55 rolled around the flange members 52 to secure the plate 54 in position and also to fix the curvature of the wheel in general. The outer flange members 53 are interengaged by the rolled over portion 56 of the outer rim or ring 57. Thus it is to be seen that the distinction of the form shown in Figs. 7–9 over the form shown in Figs. 1–6 resides in the fact that the out-turned flanges have single thicknesses of metal rather than the three thicknesses of the upturned plaits.

In either case, the wheel is formed by bringing blades originally at certain distance apart into closer relationship by plaiting the side bands of the sheet from which the blades are formed. This plaiting of those bands provides a very important forward step in the art from both the manufacturing standpoint as well as from the over-all improvement in the wheel itself.

It is to be understood in the foregoing description that the blades 17 described as being carried from a bend line 18 have that bend line 18 spaced from the line 15 a distance so as to leave a tie band 58 in effect between the two side bands 20 and 21 at each of the blades 17. In other words, the lines 11 on one side are interrupted as at E, and the lines 12 on the other side are interrupted as at F to provide for this transverse band 58 in each instance.

Therefore it is to be seen that the invention provides an exceedingly simplified and yet quite rigid structure formed by the minimum number of operations into a wheel that becomes quite rigid, and while I have described my invention in the particular forms, it is obvious that structural variations may be employed, particularly in the sequence of steps in forming the various elements, and I therefore do not desire to be limited to those precise forms beyond the limitations which may be imposed by the following claims.

I claim:

1. A blower wheel of the integral, cylindrical, strip type comprising a cylindrical drum strip having circumferentially spaced apart, transverse openings therethrough defined by substantially parallel marginal sides extending transversely of said strip and marginal ends each spaced from the respective marginal edges of said strip defining cylindrical bands between said ends and said strip edges; a plurality of blades, one for each of said openings, extending integrally from an opening common marginal side and extending transversely of said strip for the full length of said side; a portion of each of said bands having a circumferential bend therearound intermediate said opening ends and said strip edges, said band portion in each instance between said bend and said strip edge extending into an approximately radial plane portion; said band portion between said opening ends and said bend having a plurality of folds thereacross defined by bends in parallelism with said opening sides, defining a tuck at each end of each of said openings, each of said tucks being composed of a circumferential length of said last band portion folded over onto and into substantially compressive contact with itself providing a double thickness, and thence by a second length folded back over the first length providing a triple thickness, the two lengths being in substantially compressive contact one with the other, providing in each tuck an overlapping of three contacting lengths of said last band portion.

2. The structure of claim 1, in which each of said tucks extend through said bend and radially across said radial plane portion; said three tuck lengths being maintained in said compressive contact through said bend.

References Cited in the file of this patent

UNITED STATES PATENTS

| | | |
|---|---|---|
| 1,995,446 | Blake | Mar. 26, 1935 |
| 2,242,586 | Marbach | May 20, 1941 |
| 2,291,480 | Marbach | July 28, 1942 |
| 2,315,407 | Evans | Mar. 30, 1943 |
| 2,537,805 | Wilken | Jan. 9, 1951 |
| 2,684,521 | Morrison | July 27, 1954 |